K. W. BARTLETT.
MIXING APPARATUS.
APPLICATION FILED MAR. 7, 1922.
1,428,315.
Patented Sept. 5, 1922.
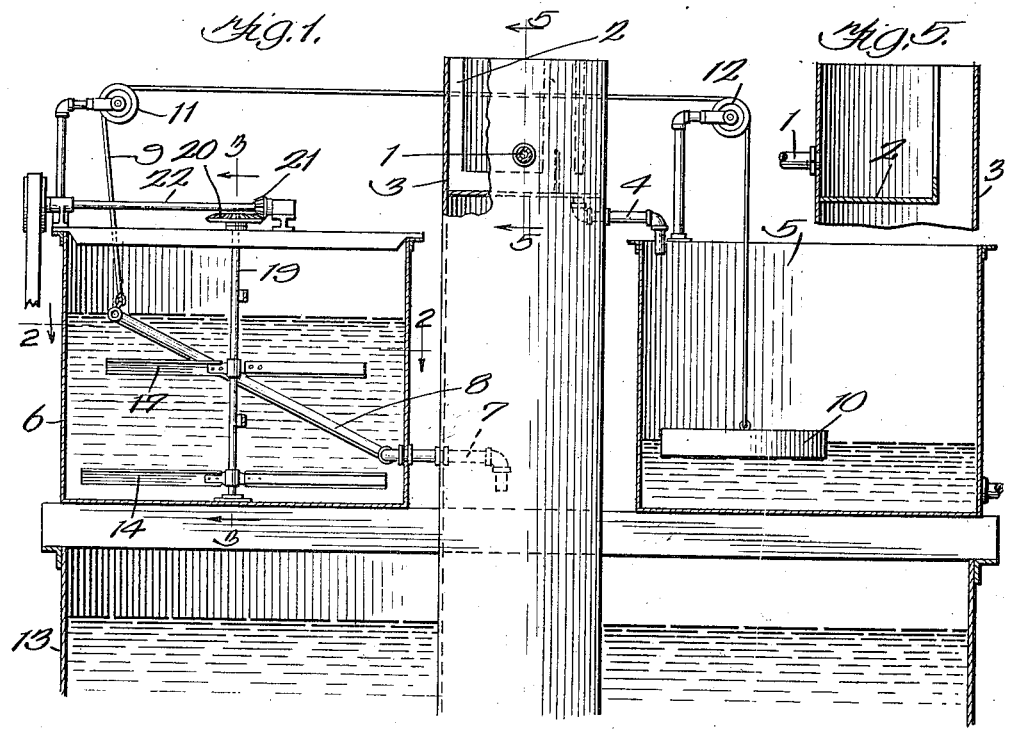
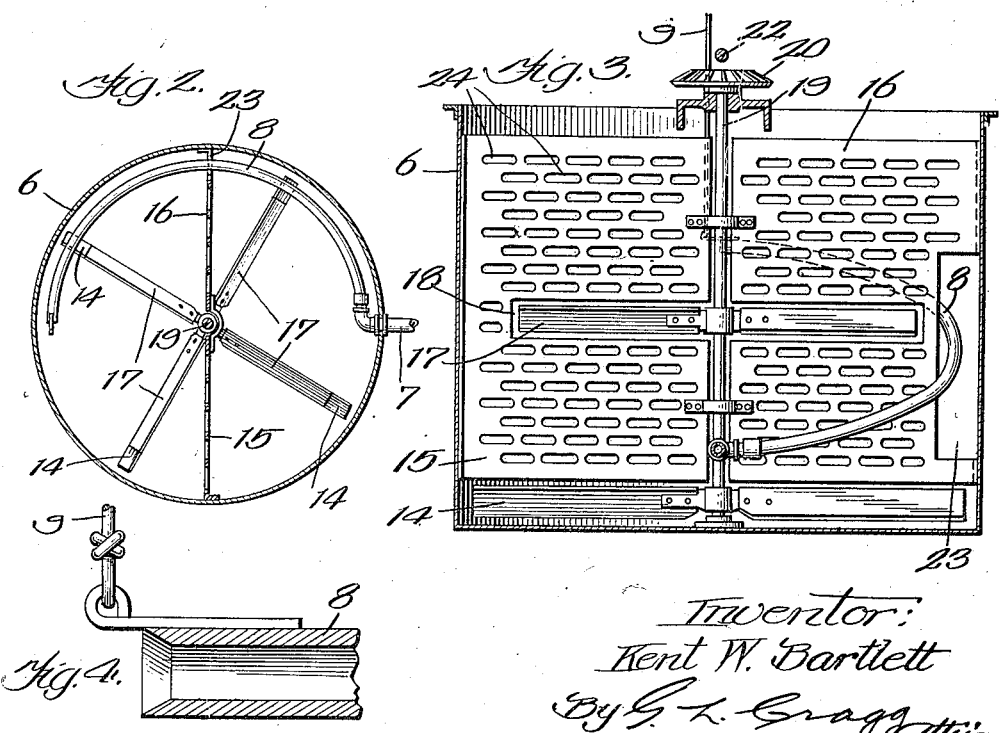
Inventor:
Kent W. Bartlett Patented Sept. 5, 1922.

1,428,315

UNITED STATES PATENT OFFICE.

KENT W. BARTLETT, OF HAMMOND, INDIANA.

MIXING APPARATUS.

Application filed March 7, 1922. Serial No. 541,766.

*To all whom it may concern:*

Be it known that I, KENT W. BARTLETT, citizen of the United States, residing at Hammond, in the county of Lake and State of Indiana, have invented a certain new and useful Improvement in Mixing Apparatus, of which the following is a full, clear, concise, and exact description.

My invention relates to mixing or agitating apparatus employing a tank, stirring apparatus within the tank, a baffle plate that co-operates with the stirring apparatus, and an inclined discharge pipe located in the tank, this pipe being open at its upper end to receive liquid which is passed through the discharge pipe to a continuation of this pipe at the lower end thereof and this continuation passing through the tank.

Hitherto the blades of the stirring apparatus have been located below the baffle and discharge pipe.

In accordance with my invention the lower end of the discharge pipe may be below blades of the stirring apparatus and the upper end of the discharge pipe may be above such blades. Blades thus related to the discharge pipe may be supplied in addition to or in replacement of the blades that were hitherto disposed below the baffle plate, as desired. In carrying out my invention the discharge pipe is bent where it intersects the plane of rotation of the blades so as to lie outside of the circle of rotation of the blades in the zone of their rotation. This result is preferably accomplished by shaping the discharge pipe in the form of a semicircle or other suitable arcuate shape.

My invention is of particular utility when employed in connection with water softening or other liquid treating equipment, being of service in the construction of the chemical supplying portion of such liquid treating equipment. When the invention is thus embodied the discharge pipe may be pivotally mounted at its lower end so that the upper end of the pipe may be maintained in suitable relation with the chemical as the level thereof varies in the tank that holds the chemical. In water softening apparatus the position of the upper end of the discharge pipe may be maintained slightly below the upper level of the chemical in the chemical tank by means of a float which is connected with the upper end of the discharge pipe and controls the position thereof by means of a divided portion of the incoming raw water that flows into the float chamber in a quantity proportional to the discharge of the chemical from the chemical tank. The invention is not to be limited, however, to its employment in water softening apparatus.

The accompanying drawing illustrates one embodiment of the invention, Fig. 1 being a vertical sectional view of the upper portion of a water softening equipment that includes the structure of my invention; Fig. 2 is a sectional view on line 2—2 of Fig. 1; Fig. 3 is a sectional view on line 3—3 of Fig. 1; Fig. 4 is a detail view, partially in section, illustrating the connection which is effected between the upper end of the discharge pipe and the cable which connects the discharge pipe with the controlling float; and Fig. 5 is a detail view taken on line 5—5 of Fig. 1.

Like parts are indicated by similar characters of reference throughout the different figures.

In the apparatus shown there is included an incoming raw water pipe 1 which supplies water to a weir box 2 that is located in and is partially formed of the reaction chamber 3. In accordance with common practice which need not be described in detail, the incoming water is divided in the weir box into major and minor streams, the major stream passing into the portion of the reaction chamber 3 that is below the weir box and the minor stream passing through a pipe 4 into a float chamber 5. The chemical is supplied to the reaction chamber 3 from the chemical tank 6 through a continuation 7 of the discharge pipe 8. This discharge pipe is hinged at its lower end so that it may be swung up and down. It is connected by means of a cable 9 with the float 10 that is in the float chamber 5, this cable passing over pulleys 11, 12. As illustrated, the fluid containing capacities of the containers 5 and 6 are equal and the pipes 4 and 7 are alike so that the ascent of the float 10 will equal the descent of the level of the chemical in the tank 6, the float 10 permitting the discharge pipe 8 to lower just to the same extent as the level of the chemical is lowered so that the upper end of the discharge pipe will always be in position properly to receive the chemical that is to be discharged into the reaction chamber. As is well understood by those skilled in the art, the water which has been treated by the chemical in the reaction chamber finds its way into the softened water tank 13.

Hitherto the chemical in the chemical tank has been agitated, in order to maintain its thorough intermixture, by means of blades 14 rotating in a horizontal plane below baffle plates occupying the position of my baffle plates 15 and 16. It has been found desirable not only to agitate the chemical at the bottom of the chemical tank but also to agitate it in the horizontal zone above the outlet end of the discharge pipe and the position assumed by the inlet end of the discharge pipe when the chemical tank is full or only partially emptied. I therefore employ another pair of agitating blades 17 which are located in said zone. The baffle plates are cut away as indicated at 18 to accommodate the blades 17. Both sets of blades are mounted upon a common upright shaft 19 which has a bevel pinion 20 fixed upon its upper end. This bevel pinion is in mesh with another bevel pinion 21 that is upon a power shaft 22. In order that the discharge pipe may swing through the zone of the upper blades 17 it is bent where it intersects the plane of rotation of the blades so as to lie outside of the circle of rotation of these blades in the zone of their rotation. The baffle plate 16 is provided with an elongated upright recess 23 through which the pipe 8 passes, the baffle plates 15 and 16 desirably being disposed in a vertical plane that is at right angles to the vertical plane in which the ends of the pipe 8 lie. The baffle plates may be of any suitable form to obstruct the movement of the chemical as it is being agitated by the chemical stirring blades. As illustrated, these blades are formed with a number of openings 24 that permit restricted bodily movement of the chemical as it is being agitated.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. Mixing apparatus including a tank; a revolving agitator within the tank; and an inclined pipe within the tank for conveying mixed material from the tank, this pipe intersecting the plane of rotation of the agitator and being bent where it intersects the plane of rotation of the revolving agitator to lie outside of the circle of rotation of this agitator in the zone of rotation thereof.

2. Mixing apparatus including a tank; a revolving agitating blade within the tank; and an inclined pipe within the tank for conveying mixed material from the tank, this pipe intersecting the plane of rotation of the agitating blade and being bent where it intersects the plane of rotation of the revolving agitating blade to lie outside of the circle of rotation of this agitating blade in the zone of rotation thereof.

3. Mixing apparatus including a tank; a revolving agitator within the tank; an inclined pipe within the tank for conveying mixed material from the tank, this pipe intersecting the plane of rotation of the agitator and being bent where it intersects the plane of rotation of the revolving agitator to lie outside of the circle of rotation of this agitator in the zone of rotation thereof; and a baffle plate structure for retarding the motion of the agitated material.

4. Mixing apparatus including a tank; a revolving agitating blade within the tank; an inclined pipe within the tank for conveying mixed material from the tank, this pipe intersecting the plane of rotation of the agitating blade and being bent where it intersects the plane of rotation of the revolving agitating blade to lie outside of the circle of rotation of this agitating blade in the zone of rotation thereof; and a baffle plate structure for retarding the motion of the agitated material.

5. Mixing apparatus including a tank; a revolving agitator within the tank; and an inclined pipe within the tank and mounted to swing at its lower end for conveying mixed material from the tank, this pipe intersecting the plane of rotation of the agitator and being bent where it intersects the plane of rotation of the revolving agitator to lie outside of the circle of rotation of this agitator in the zone of rotation thereof.

6. Mixing apparatus including a tank; a revolving agitating blade within the tank; and an inclined pipe within the tank and mounted to swing at its lower end for conveying mixed material from the tank, this pipe intersecting the plane of rotation of the agitating blade and being bent where it intersects the plane of rotation of the revolving agitating blade to lie outside of the circle of rotation of this agitating blade in the zone of rotation thereof.

7. Mixing apparatus including a tank; a revolving agitator within the tank; an inclined pipe within the tank and mounted to swing at its lower end for conveying mixed material from the tank, this pipe intersecting the plane of rotation of the agitator and being bent where it intersects the plane of rotation of the revolving agitator to lie outside of the circle of rotation of this agitator in the zone of rotation thereof; and a baffle plate structure for retarding the motion of the agitated material.

8. Mixing apparatus including a tank; a revolving agitating blade within the tank; an inclined pipe within the tank and mounted to swing at its lower end for conveying mixed material from the tank, this pipe intersecting the plane of rotation of the agitating blade and being bent where it intersects the plane of rotation of the revolving agitating blade to lie outside of the circle of rotation of this agitating blade in the zone of rotation thereof; and a baffle plate structure for retarding the motion of the agitated material.

In witness whereof, I hereunto subscribe my name this 20th day of February A. D., 1922.

KENT W. BARTLETT.